United States Patent
Harris (10) Patent No.: US 8,090,952 B2
(45) Date of Patent: Jan. 3, 2012

(54) COUNTERFEIT PREVENTION SYSTEM BASED ON RANDOM POSITIONING ON A PATTERN

(76) Inventor: Scott C. Harris, Rancho Santa Fe, CA (US)

( * ) Notice: Subject to any disclaimer, the term of this patent is extended or adjusted under 35 U.S.C. 154(b) by 880 days.

(21) Appl. No.: 11/774,516

(22) Filed: Jul. 6, 2007

(65) Prior Publication Data

US 2009/0097647 A1 Apr. 16, 2009

(51) Int. Cl.
*H04L 9/32* (2006.01)
(52) U.S. Cl. ............. 713/176; 713/179; 283/73; 283/81
(58) Field of Classification Search ................... 713/176, 713/179; 283/73, 81
See application file for complete search history.

(56) References Cited

U.S. PATENT DOCUMENTS

| | | | | |
|---|---|---|---|---|
| 3,891,324 A * | 6/1975 | Davies | ........................... | 356/615 |
| 5,605,738 A * | 2/1997 | McGinness et al. | ........ | 428/195.1 |
| 5,974,150 A * | 10/1999 | Kaish et al. | ................... | 713/179 |
| 6,069,955 A * | 5/2000 | Coppersmith et al. | .......... | 380/54 |
| 6,212,504 B1 * | 4/2001 | Hayosh | ............................ | 705/64 |
| 6,226,619 B1 * | 5/2001 | Halperin et al. | ................ | 705/23 |
| 6,327,801 B1 * | 12/2001 | Witkowski | ...................... | 40/306 |
| 6,330,976 B1 * | 12/2001 | Dymetman et al. | .......... | 235/487 |
| 6,364,990 B1 * | 4/2002 | Grosskopf et al. | ............ | 156/268 |
| 6,564,527 B1 * | 5/2003 | Focke et al. | ....................... | 53/53 |
| 6,600,823 B1 * | 7/2003 | Hayosh | ........................... | 380/51 |
| 6,606,396 B1 * | 8/2003 | Ishibashi et al. | .............. | 382/112 |
| 6,735,575 B1 * | 5/2004 | Kara | ................................ | 705/50 |
| 6,996,543 B1 | 2/2006 | Coppersmith et al. | | |
| 7,204,421 B2 * | 4/2007 | Austin | ..................... | 235/462.01 |
| 2003/0224751 A1 | 12/2003 | Vanderhelm et al. | | |
| 2005/0090233 A1 | 4/2005 | Chambers et al. | | |
| 2005/0132194 A1 * | 6/2005 | Ward | ............................ | 713/176 |
| 2005/0182605 A1 * | 8/2005 | Agrawala et al. | ................. | 703/2 |
| 2005/0234823 A1 | 10/2005 | Schimpf | | |
| 2006/0082761 A1 * | 4/2006 | Nakamura et al. | .............. | 356/71 |
| 2006/0157574 A1 * | 7/2006 | Farrar et al. | ................... | 235/494 |
| 2006/0244253 A1 * | 11/2006 | Wei | ................................ | 283/81 |
| 2006/0282672 A1 * | 12/2006 | Sanchez et al. | ............... | 713/176 |
| 2007/0070372 A1 * | 3/2007 | Lapstun et al. | ............. | 358/1.12 |
| 2007/0126226 A1 * | 6/2007 | Kolodzie et al. | ................ | 283/72 |
| 2007/0228166 A1 * | 10/2007 | Lui | ................................ | 235/454 |
| 2008/0181447 A1 * | 7/2008 | Adams et al. | ................. | 382/100 |
| 2008/0197620 A1 * | 8/2008 | Spencer et al. | ................. | 283/81 |
| 2009/0080760 A1 * | 3/2009 | Knysh et al. | .................. | 382/141 |
| 2009/0160177 A1 * | 6/2009 | Dietrich et al. | ................. | 283/70 |
| 2009/0218391 A1 * | 9/2009 | He | ............................... | 235/375 |

FOREIGN PATENT DOCUMENTS

WO WO 9904364 A1 * 1/1999
* cited by examiner

*Primary Examiner* — Nathan Flynn
*Assistant Examiner* — Sarah Su
(74) *Attorney, Agent, or Firm* — Law Office of Scott C. Harris, Inc.

(57) ABSTRACT

A genuine detection part for a product formed by a label with a continually repeating pattern and with a sticker over the pattern. The position of the sticker is converted to a number, and encrypted with a private key, to form a signature. The product is only legitimate if the signature matches the position of the sticker on the pattern.

10 Claims, 5 Drawing Sheets

COUNTERFEIT PREVENTION SYSTEM BASED ON RANDOM POSITIONING ON A PATTERN

This application is related to Ser. No. 11/688,801, filed Mar. 20, 2007.

BACKGROUND

Counterfeit name brand items are prevalent. Sometimes the counterfeit items use packaging that is identical to the legitimate version, and virtually undetectable from the packaging of the authentic item. For example, counterfeit name brand items such as perfumes, ink cartridges, toner cartridges, and other consumables, sunglasses, clothing, women's purses and the others, may be made in a way where the packaging is impossible to detect from the original.

Sometimes, even legitimate retailers are fooled. Many retailers buy through wholesalers or other middlemen. Unless the reseller gets the product directly from the manufacturer, they may be fooled by a good copy from their supplier. Even when the retailers think they are buying from the manufacturer, they may be fooled by a phishing or other scam into buying counterfeit items.

The problem is even worse for consumers. Consumers can virtually never be sure that an item they are buying is genuine. Virtually any kind of packaging can be copied by a sufficiently determined copier.

SUMMARY

The present application describes using a cryptography application to ensure that an item is genuine.

In an embodiment, a repeating pattern is used, and a code is formed by a placement of a label on the pattern. The placement of the label becomes random. The placement of the label is used to form a second code, using a public key encryption system. Only the legitimate manufacturer has the private key. Therefore, only the legitimate manufacturer can use their private key to form the second code.

Any user, however, can get the public key, and can use that public key to verify that the second code is actually formed from the first code and is actually genuine.

Structure is described herein for determining this. According to one aspect, a clearinghouse system or trusted website system is used. A user can take a photograph of the codes, and send them to the trusted website. In one aspect, the photograph can be taken from a user's personal communication system such as a PDA or cell phone, which carries out a communication such as email or telephone call at a different time.

Another embodiment may use a dedicated scanner system in order to test authenticity of the items.

BRIEF DESCRIPTION OF THE DRAWINGS

FIGS. 6-12 show additional aspects of a system using a repeating pattern, and a marking of the pattern by a sticker or the like.

DETAILED DESCRIPTION

Figure 1:
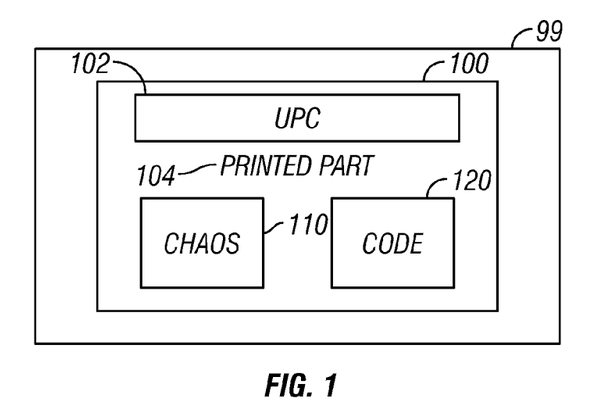
FIG. 1 shows an exemplary label layout.

An embodiment is shown in FIG. 1 which illustrates an item 99, and a identifying label 100. The term "label" is used herein, but it should be understood that the label can in fact be an electronic file, or can be a conventional paper label. In the embodiment, the label 100 is a paper sticker that is stuck to the item 99. The label 100 may include a number of readable portions including a UPC code 102, a printed part 104 that says in text some information about what the item is, as well as the cryptographic code portion. The cryptographic code portion includes a chaos portion 110, and a code portion 120.

The chaos portion is a portion which is formed totally or partially using random processes. The properties of chaos cause the code to include a layout which is wholly chaotic, and cannot be reproduced or regularized by any function. Example chaotic functions which can be used may include for example, a drip from water or some other fluid like ink. Details of spray from a nozzle, such as an inkjet nozzle or other nozzle can be used. Crack patterns that cause or are formed in certain materials drying can be used. Therefore, an ink can be sprayed on with specified functions that cause it to crack according to random processes. Similarly, a polymer or other curing material can be used to form crack patterns or other texture patterns. Many other chaotic or random functions are known. An important feature of the chaos function is that it will form a non-predictable part each time. There is no way for an attempted copier to reproduce any specific chaos function. While two of the functions may be the same through coincidence, there is no way to predict what the function will be in advance or to force it to be the same as some other function.

The code portion 120 is a printed value that is representative of information in the chaos function, encrypted using the private key of a public key system. Alternatively, any cryptographic system can be used. For example, there are many cryptographic systems which are in effect one-way: the public has the capability of carrying out one function on them but not the other. A typical use for such cryptographic systems is in a public key system, where at least some users are given the public key, and can hence decode messages that are encoded using the owner's private key. However, only the authorized user can encode those messages using their own private key.

A one-way private function is used to form the code 120. In one embodiment, a bitmap image of the chaotic function may be formed, and that bitmap image is then encoded using the private key. Other embodiments may obtain different information indicative of the chaos function, and encode that information using the private key to form the code. The code 120 may be printed as a number, or any machine-readable function. For example, this may use a barcode; either one or two-dimensional, or may use any other image based system that can encode information.

In one particular embodiment, both the code portion 120 and the chaos portion 110 are stickers that are stuck onto the printed part. This all may be formed as one unit. In addition, while the above shows embodiments where the chaos portion is a specified portion of the label, the chaos portion may actually be part of the object, e.g. part of the design on the object itself, or the way that the material seams meet or fit, or some other function. Alternatively, it can be printed anywhere.

Note that even though an image of the chaos portion is obtained for purposes of authenticity verification, an image inherently cannot be securely used for the chaos portion in this embodiment. The chaos portion must be formed naturally, so that the chaotic processes change the way the portion looks. An image can be electronically manipulated, and hence could be manipulated to have any desired characteristic. While the user may obtain an image of that chaotic portion in order to decode it, the chaotic portion itself is preferably not an image. For example, it may be a polymer or the like or other things described above, and the look of that chaos portion is what is imaged.

The above describes a few different chaos portions that can be used. However, it is contemplated that many and much more difficult-to-copy chaos portions can be used. The key is that the portion is in effect random, so that a user cannot simply copy it.

Figure 2:
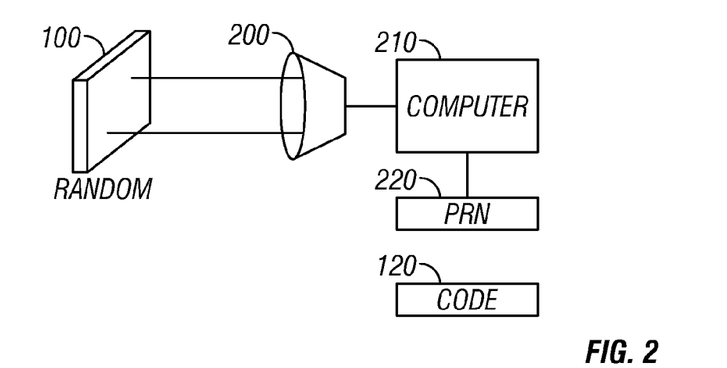
FIG. 2 shows a hardware system for forming the label and
FIG. 3 shows a flowchart of operation of that hardware system.

FIG. 2 illustrates the hardware that can be used to form the code. The chaos portion 110 is imaged by a camera 200 that is connected to a computer 210 running the flowchart of FIG. 3 discussed herein. The computer 210 drives a printer 220 that prints the code 120, for example on a sticker. The printer 220 may alternatively print the code directly onto the same substrate that holds the chaos portion.

Figure 3:
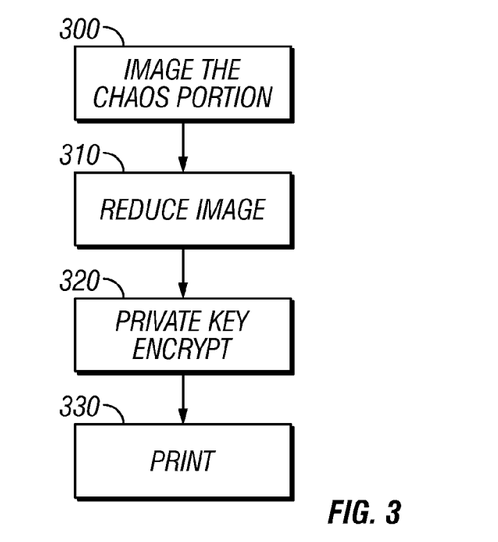

The computer operates as follows. At 300, the computer images the chaos portion, forming an image thereof. The image is preferably a bitmap, taken at high resolution. At 310, the image is reduced. This can use any of a number of different techniques of reducing the image. In an embodiment, the image can be reduced according to minutia, so only minutia that have a certain relevance level are maintained in the image. For example, the 10 most relevant image portions may be used. An alternative system may reduce the image according to only specified parts, so only specified features at specified geographic portions of the image may be used. For example, the feature closest to the top right corner may be used, along with the feature closest to the geometrical center. This may also be maintained as a secret, so that the forger does not know which portions of the image are used.

At 320, the private key is used to encrypt those features from the image. As an alternative, specified features of the image may be used to form a number, for example a number of cracks in the image, an average texture of the image, ratios between different parts in the image, average spacing between the items in the image, and the like.

At 330, those features which are encrypted are formed into some readable form, preferably a machine-readable form. The form may be for example, any kind of machine-readable code that represents information. In the embodiment, this may use a barcode type system, which is printed at 330.

Figure 4:
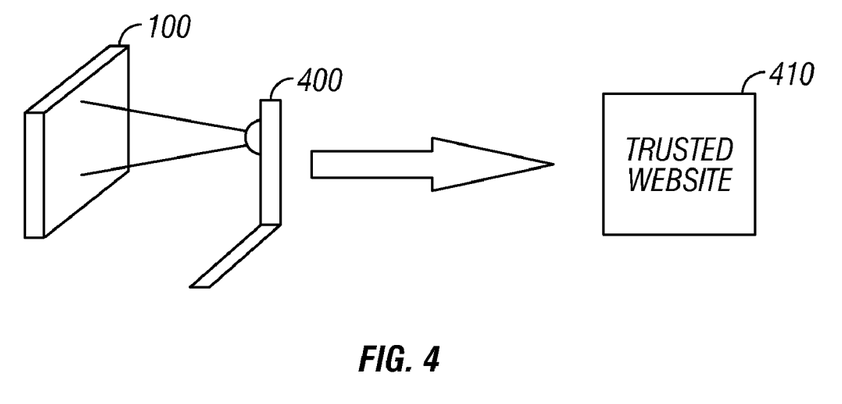
FIG. 4 shows a hardware system for reading the label.

An important part of the operation is how this can be used to verify the authenticity of the object. FIG. 4 illustrates an embodiment. The label 100 is shown in FIG. 4 as being imaged by a personal communication device 400, here a cell phone. The camera in the cell phone obtains an image of the label, which is then sent via e-mail or via Internet access to a trusted website 410. The trusted website may be a clearing house which is established for the purpose of verifying the authenticity of items, and may include the public key used for a number of these items. Different techniques are known in the art for establishing trusted websites, and the process of establishing a trusted website is not discussed in detail herein. For example, in the example of a cell phone, one of the pre-programmed Internet access points may be the address of the trusted website. Other PDAs, such as Blackberries and the like may be similarly used and may come pre-programmed with the website of address of a trusted website. Also, the same private/public key pair may be used for many different product to simplify the authentication.

The image information is sent to the trusted website, which carries out an authenticity operation.

As an alternative, the embodiment of FIG. 4 may also be used with a program that runs in the phone or PDA 400. In that case, the phone or PDA carries out these operations, and the phone or PDA must store the public keys for the specified items in order to authenticate these items. Either the phone 400 or the website 410 runs the flowchart of FIG. 5. At 500, the system reads the code and reads the chaos code, using its camera. For example, the reading of the code may use the camera to obtain an image of a barcode, and to decode the barcode using techniques which are similar to those in CCD barcode scanners. The system also reads the chaos code, by obtaining an image of the chaos code. At 510, the system decrypts the chaos code using its public key. At 520, the image obtained at 500 is processed, using the same reduction technique which is used in 310. Again, for example, this may obtain minutia, or may obtain specified areas of the image. Other reduction techniques are also contemplated. At 530, the image which is reduced by 520 is compared with the chaos code. A least-mean-squares comparison can be used for example to see if the two images agreed by a specified amount for example 80%. Exact matches can also be required, but a less than 100% match may be useful to reduce false rejections.

Figure 5:
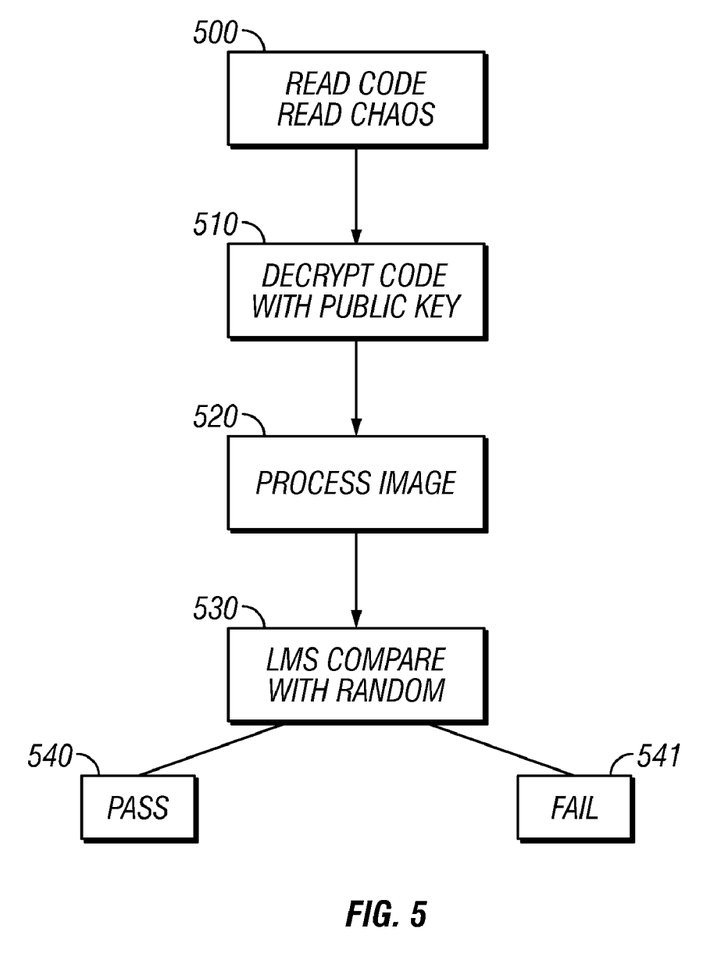
FIG. 5 shows a flowchart of operation of that system.

If the least-mean-squares comparison is successful, an indication of pass is returned at 540, otherwise an indication of fail is returned at 541.

Another embodiment operates using the same techniques, but using code 110 that is not necessarily be chaotic. For example, code 110 may be one of a plurality of different first codes. As one example, there may be a thousand different first codes. Either the UPC or the printed part may then include some identifier, such as the date. The code is then formed as a one-way code indicative of the first code concatenated with the date.

This embodiment as the conceivable disadvantage that it may be simpler to copy. If an illegal copier obtains one of the codes, they can copy it exactly, to create other ones. However, this exact copy will be difficult to make, and may take time. This system can still produce fairly good and sophisticated protection, since the copier will only be able to exactly copy what is already been produced.

In this second embodiment, for example, the code 110 can be a code which is simply a string of numbers encoded into a barcode. The string of numbers can be a random number, and can be intended to be used only once. In that way, the database can recognize that the code is being pirated, and deactivate the use of that code.

Figure 6:
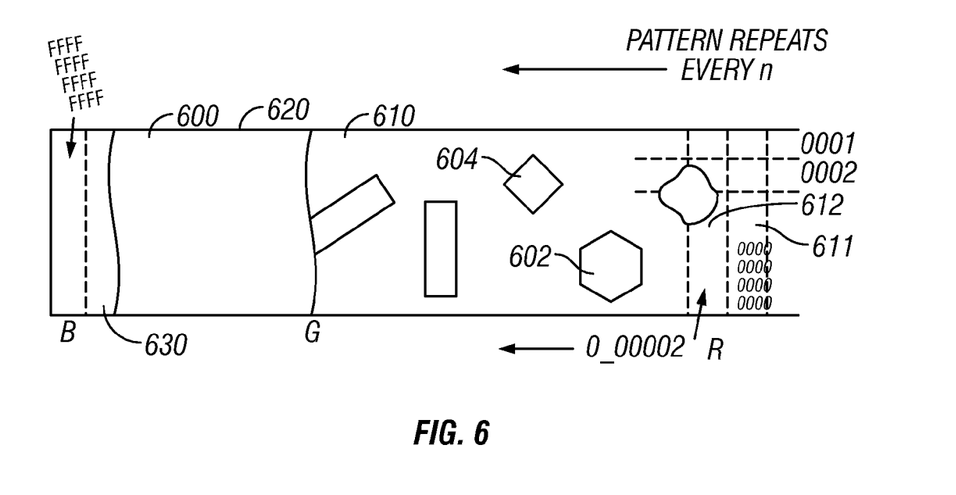

Another embodiment is shown in FIG. 6. In this embodiment, a system is used which has a periodically-repeating pattern. The random information is taken from a selected position of this periodically repeating pattern.

An embodiment uses a sticker to mark a portion of the pattern. Other embodiments may mark the pattern portion in other ways, e.g., with a marker such as a pen or printer, or with a punch that removes a portion.

A repeating pattern 600 is formed. The repeating pattern may include plural geometric shapes such as 602,604. The geometric shapes can be in different locations, and each geometric shape may be individually recognizable both from its shape, its size, and its position. Another aspect however, may put readable information on parts of the pattern. For example, different areas of the pattern may be colored in complimentary colors to display a message. That message can be, for example, a manufacture date, a use-by date, or the like.

A pattern of shapes in different locations is formed. The pattern of shapes repeats after an interval. However, the repeating areas may have the same shapes, but in different colors. Area 610 may be in a first color, here red, while area 620 is in a second color here green, and area 630 is blue. The pattern continually repeats along the entire roll and the color sequence also repeats.

FIG. 6 also illustrates how the pattern is arranged into sections. Vertical sections such as 611, 612 defines swaths along the pattern. Each section has an associated number, which may be a 16 digit hex number representing its position. In a similar way, horizontal sections are numbered in a similar way; shown as 0001 and 0002 in FIG. 6. Based on these sections, each pattern item, e.g. the diamond 604, and portions of those pattern items, have defined and numbered sections. For example, the bottom edge of the diamond 604 could be defined by its coordinates on the pattern, with hex values defining those coordinates. The pattern is shown as being on a roll, but it could also be any sizes in the two dimensions.

Figure 7:
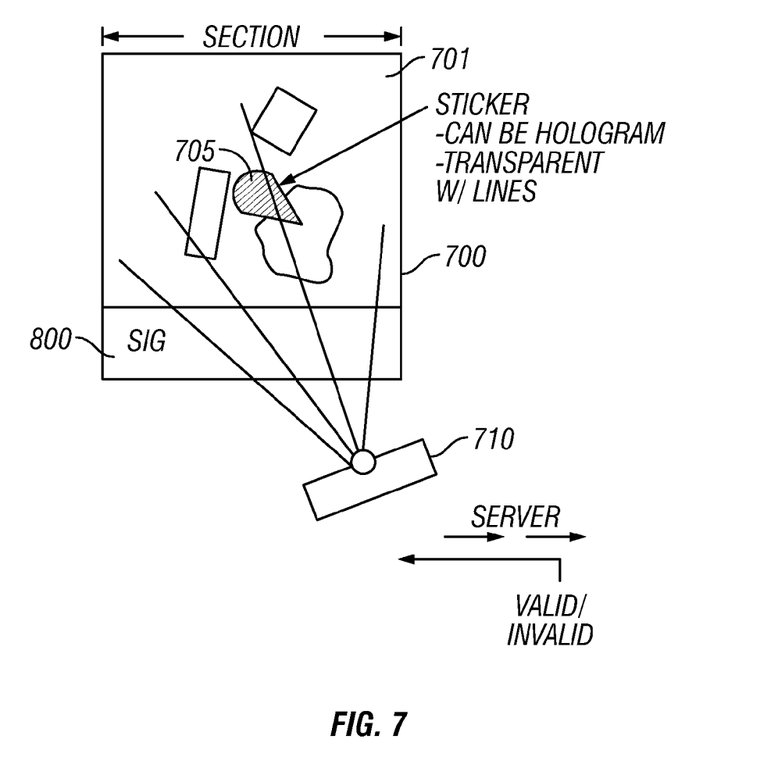

In operation, as shown in FIG. 7, a section 700 of the underlying label is selected, to use as a label on a product. The section 700 may be randomly selected. Edges of the section can be torn or cut, with the tearing, for example, defining a pattern of zigzags or random shapes at the edge. The tearing of the label creating the zigzag torn effect may be difficult to reproduce without actually tearing an edge. Therefore, each section of label is, in general, going to be slightly different.

A sticker 705 is placed at a random location on the pattern. The sticker 705 can be one of a number of different shapes, as taken off a group of stickers that each defines different shapes. It can be a single shape. The orientation of the sticker, however, will vary, since it is randomly placed. The sticker can also include a hologram or a transparent spot.

Figure 8:
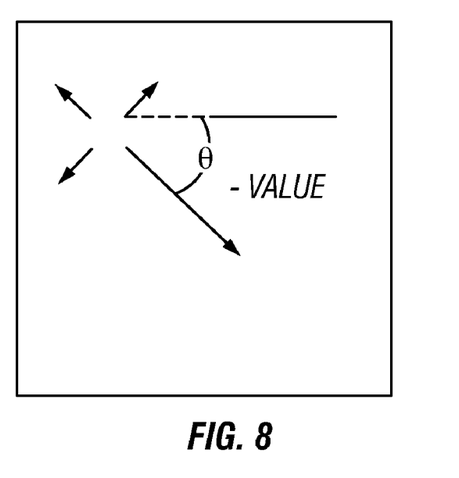

FIG. 8 illustrates how the angle $\Theta$ of the sticker can also be converted into a number. Therefore, many aspects of the section and sticker can be converted into numbers.

Figure 9:
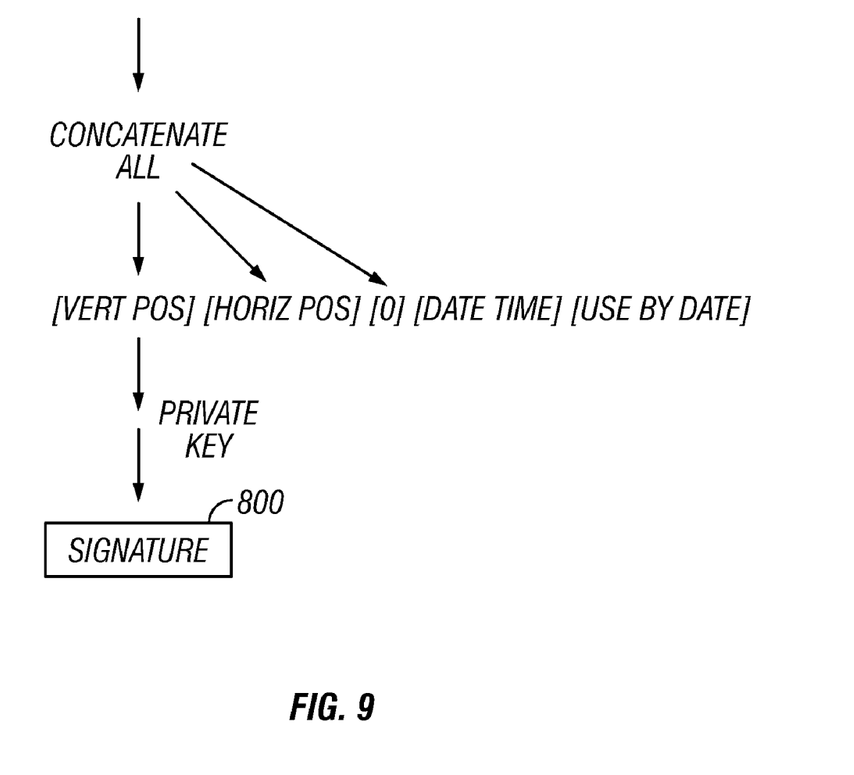

The authorized manufacturer obtains an image of the area 700 on a label 701, with the sticker 705 thereon. FIG. 9 illustrates how this is concatenated both with the vertical position number, the horizontal position number, angle number, and may also include a random value such as the date time. All of this is used with a private part of the encryption key to obtain a signature shown as 800. The signature 800 is also printed adjacent to the label 700, to represents at least some of the values in the label 700. As in the above embodiments, a counterfeiter cannot form an authorized label without access to the private key. They might be able to copy the entire image (of the area and sticker) and key, but the copied image will not look real. It will not be two dimensional as the sticker over the area would create. The cut portions will not look cut. Moreover, every copy would be exactly the same, and hence two of the labels being next to each other look exactly the same—each genuine item, in general, would be unique.

In operation, an imager, such as a cellular telephone or the like 710 may obtain an image of the entire scene including the number, send it to a server, which validates the image and sends back a valid or invalid indication of authenticity. Security from this system is obtained from the encryption and the difficulty in copying the area and sticker. The place where the label is selected and where the sticker is chosen, are in essence random. Accordingly, the only way that an infringer can copy this is to copy the signature exactly. This becomes extremely difficult from the fact that the sticker 705 would have to be put in the same place each time.

In addition, since the information is sent to the server, the server can affect reject images that are too similar to other images that have been seen in the past, and flag those images as likely counterfeits.

Figure 10:
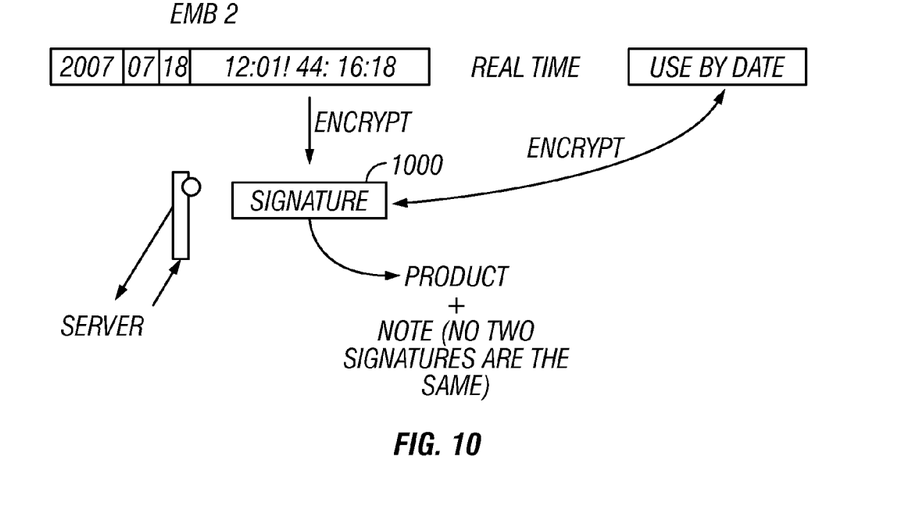

Another embodiment is illustrated in FIG. 10. In this embodiment, a real-time clock is used as part of making the label. The real-time clock maintains a time to hundreds, thousands, 10,000ths, hundred thousands or millions of a second. The clock time is encrypted as part of the signature 1000. Because of the short time intervals, the actual time when the clock value is taken to make a code will vary for each code. However, each of the signatures will be unique, especially if they are taken at very short time intervals, e.g., $\frac{1}{10,000}$ths of a second. While the would-be copier can copy the signature exactly, potential purchasers would easily be able to see that all of the signatures on all of multiple products were the same. In this and other similar embodiments, the signature would be imprinted on a product along with a note that no two signatures should be the same. If the would-be purchasers simply looks look at two products, they can see that the signatures are different. In addition, the purchaser can send the signature using their cell phone, to a server, and get back an indication on their cell phone about whether the signature was properly encrypted, whether it represents a real time, and also importantly, whether that real time has ever been used by any other signature. If any other signature uses that same real time, then an indication is sent back at the product may be a forgery.

Another part of FIG. 10 may encode a 'use-by' date as part of the encrypted code. This again can thwart fakes, since it puts inherent end time limits on the use of a copied code. Someone who copies a code would only be able to use that code for a short time—or else the use-by date would be exceeded.

Another embodiment may also print the use by date in readable characters, and tie the coding of those characters to the encrypted part.

Figure 11:
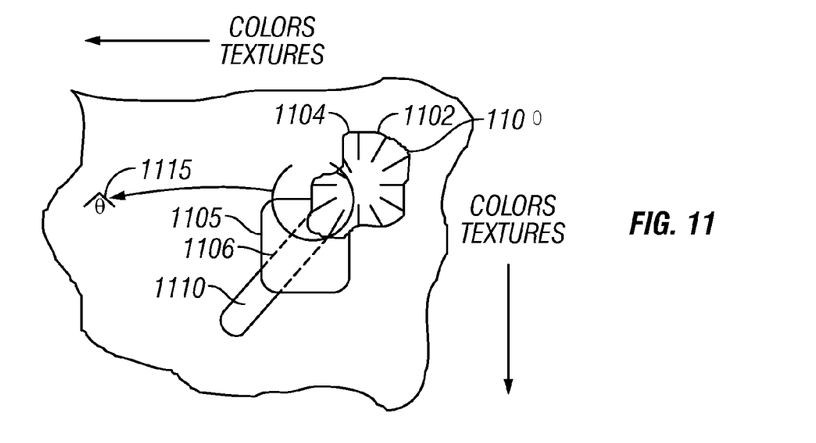

Another embodiment, shown in FIG. 11, is like FIG. 6 in that a material is provided where the colors, textures and the like evolve along the material. In the FIG. 11 embodiment, however, the colors and textures are formed in two elongated orthogonal dimensions. In this embodiment, at least one of the textures such as 1100, or the stick on sticker such as 1105, includes a registration mark thereon. 1100 includes a number of registration marks such as 1102, 1104, and the like. The sticker 1105 includes only one such registration mark shown as 1106. The registration marks enable two different operations. The registration mark 1106 may enable checking only a swath of the material, shown as 1110. In addition, the angle between that swath, and any of the registration marks on the item 1100 can be tested. That angle, for example the angle $\theta_1$ shown as 1115, can be used as part of the determination information.

Figure 12:
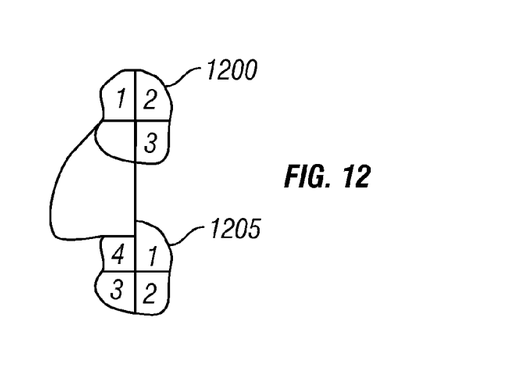

FIG. 12 illustrates an alternative way in which each of the items, such as 1200, 1205 are divided into quadrants. The number of quadrants which are covered by the sticker may be used as part of the numerical designation discussed above.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, the above describes only a specific type of one-way code, but there are many more sophisticated one-way codes that can be used. The above also describes the use of different kinds of information readers, but it should be understood that other kinds of information readers can alternatively be used. The above describes certain features, e.g., geometric features, but it should be understood that other features can be used. Also, the preferred application is for using these in detecting authentic goods, but different applications are also contemplated such as in tickets for events, and other authentication.

Also, the inventor intends that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned.

What is claimed is:

1. A method comprising:
    marking a position on a preprinted pattern that has recognizable portions to form a marked pattern, wherein said marking comprises placing a sticker on a portion of said preprinted pattern, wherein said pattern is a continuously repeating preprinted pattern with multiple different recognizable shapes that continuously repeat;
    using a computer which includes a computer program for obtain a numerical value based on a position where said sticker is placed on said preprinted and continually repeating pattern, where said numerical value corresponds to a placement of the sticker on the portion, said numerical value including at least a first numerical part representing which of a plurality of said different shapes on the preprinted pattern are marked, and a second numerical part representing an orientation of the sticker on said shapes; and
    using a private encrypting key on said computer for encrypting said numerical value, to form an encrypted signature that is based on where said sticker is placed on said pattern including which of said shapes are marked and the orientation.

2. The method as in claim 1, further comprising marking a second indication, where said second indication represents said encrypted signature, in a location near said marked pattern.

3. The method as in claim 2, further comprising sending information indicative of said encrypted signature and said second indication to a server, and obtaining information from said server indicative of whether said signature matches said marked pattern.

4. The method as in claim 3, wherein said information is indicative of whether a product associated with said marked pattern is a legitimate product.

5. The method as in claim 1, further comprising assigning portions on the pattern with numerical designations, and using said designations to determine said numerical value.

6. A method comprising:
    marking a position on a preprinted pattern, wherein said pattern is a continuously repeating preprinted pattern with multiple different recognizable shapes that continuously repeat, said marking forming a marked pattern, wherein said marking comprises placing a sticker on a portion of said preprinted pattern;
    obtaining a numerical value that indicates a position where said continuously repeating pattern is marked, said numerical value including at least a first numerical part representing which of a plurality of said different shapes on the preprinted pattern are marked, and a second numerical part representing an orientation of the sticker on said shapes;
    using a private encrypting key for encrypting said numerical value that indicates said position on said pattern, to form an encrypted signature that is based on said position of said marking on said continuously repeating pattern and producing a visual indication of said encrypted signature; and
    obtaining a picture of said marked pattern that includes the position where the preprinted pattern is marked on said continuously repeating pattern and said encrypted signature from a communication device on a server, and sending a response from said server, said response from said server indicative of whether said encrypted signature matches said marked pattern and also that information in said picture does not match other pictures that have been previously analyzed.

7. A computer system comprising: a computer processing means for creating a legitimacy mark; a printing means for printing said legitimacy mark; said legitimacy mark including a preprinted pattern that has multiple recognizable portions thereon, at least one of which portions is marked to form a marked pattern by placing a sticker on a portion of said preprinted pattern, wherein said pattern continuously repeats and includes multiple different shapes that are each recognizable; and an encrypted signature that is encrypted based on a numerical value obtained from the marked pattern using a private encrypting key that encrypts said numerical value related to a position of said marking, with an indicia of said encrypted signature being located adjacent said marked pattern, and said numerical value is determined by assigning a numerical designation to which of said recognizable shapes within said repeating pattern are marked, where said numerical value corresponds to a placement of the sticker on the portion, including at least a first numerical part representing which of a plurality of said shapes on the preprinted pattern are marked, and a second numerical part representing an orientation of the sticker on said shapes.

8. The computer system as in claim 7, further comprising a server processing means for receiving information indicative of said encrypted signature and said marked pattern, and returning information indicative of whether said signature matches said marked pattern.

9. The computer system as in claim 7, wherein said pattern includes plural colors that are each recognizable.

10. A method comprising:
    receiving a picture of information indicative of a product that has been marked with a genuinity code including a pattern portion that has recognizable portions, and a marking portion overlaying said pattern portion, wherein said marking portion is a sticker over said pattern portion;
    wherein said pattern portion is a portion of a continuous sheet that includes a preprinted repeating and period pattern, with multiple different recognizable shapes that continuously repeat;
    receiving an encrypted signature indicative of a location where said marking portion overlays said pattern portion, said encrypted signature encrypted using a private encrypting key for encrypting a value related to said pattern portion and said marking portion to form said encrypted signature that is based on a marked position where said marking portion overlays said pattern;

wherein said using comprises determining a numerical value based on said marked position on the pattern, where said numerical value corresponds to a placement of the sticker on the portion, including at least a first numerical part representing which of a plurality of said shapes on the pattern are marked, and a second numerical part representing an orientation of the sticker on said shapes;

determining, in a server, if said information in said picture matches another picture that has been previously analyzed according to a threshold; and returning an indication of whether said genuity code represents a genuine article only if both said location where said marking portion overlays said pattern portion matches information in said signature and also that said information in said picture does not match said another picture that has been previously analyzed.

* * * * *